United States Patent
Sohmshetty et al.

(10) Patent No.: US 11,556,112 B2
(45) Date of Patent: Jan. 17, 2023

(54) SYSTEM AND METHOD FOR GENERATING DYNAMIC MANUFACTURING PROCESS SEQUENCES

(71) Applicant: Ford Global Technologies, LLC, Dearborn, MI (US)

(72) Inventors: Raj Sohmshetty, Canton, MI (US); Mario Anthony Santillo, Canton, MI (US); Justin Miller, Berkley, MI (US); Meghna Menon, Rochester Hills, MI (US); Matthew Cui, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 17/063,291

(22) Filed: Oct. 5, 2020

(65) Prior Publication Data
US 2022/0107623 A1 Apr. 7, 2022

(51) Int. Cl.
*G05B 19/418* (2006.01)
*G05B 19/4155* (2006.01)

(52) U.S. Cl.
CPC ... *G05B 19/4155* (2013.01); *G05B 19/41825* (2013.01); *G05B 2219/31372* (2013.01)

(58) Field of Classification Search
None
See application file for complete search history.

(56) References Cited

U.S. PATENT DOCUMENTS

| | | |
|---|---|---|
| 9,747,575 B2 | 8/2017 | Jain et al. |
| 2003/0139952 A1 | 7/2003 | Lubash et al. |
| 2009/0222123 A1 | 9/2009 | Nevills et al. |
| 2021/0232989 A1* | 7/2021 | Rana ............... G05B 19/41895 |

FOREIGN PATENT DOCUMENTS

CN 105045236 2/2018

OTHER PUBLICATIONS

Intel, The Intelligent Factory is Open, Autonomous, and Ever-Evolving, Intel Corporation brochure, 2018.

* cited by examiner

*Primary Examiner* — Ryan A Jarrett
(74) *Attorney, Agent, or Firm* — Burris Law, PLLC

(57) ABSTRACT

A method includes defining a manufacturing transformation for a mobile workpiece based on mobile workpiece state information of the mobile workpiece, where the manufacturing transformation is an automated operation to be performed on the mobile workpiece. The method includes selecting a set of one or more manufacturing systems from among the one or more manufacturing systems for the mobile workpiece based on the manufacturing transformation and manufacturing system state information associated with the one or more manufacturing systems, where the manufacturing system state information provides data related to at least one of availability, capability, and constraints of the of the one or more manufacturing systems. The method includes defining manufacturing process steps of the manufacturing transformation based on the set of one or more manufacturing systems. The method includes defining a location for performing the manufacturing process steps on the mobile workpiece.

18 Claims, 2 Drawing Sheets

SYSTEM AND METHOD FOR GENERATING DYNAMIC MANUFACTURING PROCESS SEQUENCES

FIELD

Figure 1:
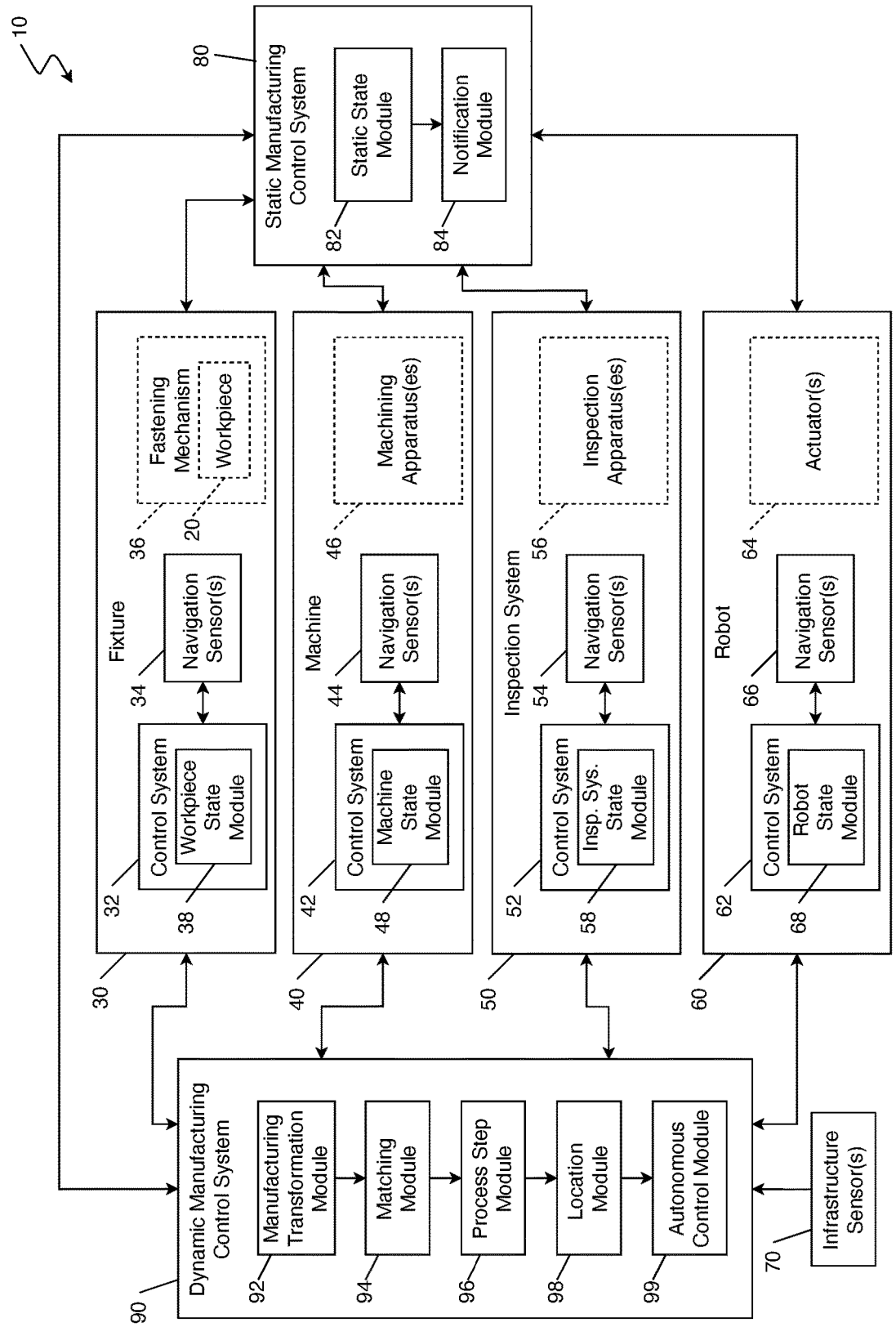

The present disclosure relates to systems and methods for generating dynamic manufacturing process sequences.

BACKGROUND

The statements in this section merely provide background information related to the present disclosure and may not constitute prior art.

A manufacturing environment can include fixed manufacturing system such as fixed machines, fixed robots, and/or fixed inspection systems. Each of these manufacturing systems is utilized in a collective manner to carry out a defined manufacturing process on a component (e.g., a vehicle part) secured to the workpiece. However, as a result of various manufacturing systems being fixed in the manufacturing environment, it may be difficult for certain manufacturing processes to efficiently adapt to design variations and/or quality issues associated with the component.

These issues with certain manufacturing processes in a manufacturing environment, among other issues with said manufacturing processes, are addressed by the present disclosure.

SUMMARY

This section provides a general summary of the disclosure and is not a comprehensive disclosure of its full scope or all of its features.

The present disclosure provides a method that includes defining a manufacturing transformation for a mobile workpiece based on mobile workpiece state information of the mobile workpiece, where the manufacturing transformation is an automated operation to be performed on the mobile workpiece. The method includes selecting a set of one or more manufacturing systems from among the one or more manufacturing systems for the mobile workpiece based on the manufacturing transformation and manufacturing system state information associated with the one or more manufacturing systems, where the manufacturing system state information provides data related to at least one of availability, capability, and constraints of the of the one or more manufacturing systems. The method includes defining manufacturing process steps of the manufacturing transformation based on the set of one or more manufacturing systems. The method includes defining a location for performing the manufacturing process steps on the mobile workpiece.

In some forms, the mobile workpiece state information includes a part type, quality data associated with mobile workpiece, inspection data associated with the mobile workpiece, or a combination thereof.

In some forms, the one or more manufacturing system include a mobile machine, a mobile inspection system, a mobile robot, or a combination thereof.

In some forms, the manufacturing system state information includes, for the mobile machine, machine data that includes identification information of the mobile machine, physical parameters of the mobile machine, operational capabilities of the mobile machine, operational constraints of the mobile machine, an availability of the mobile machine, or a combination thereof. The manufacturing system state information includes, for the mobile inspection system, inspection system data that includes identification information of the mobile inspection system, physical parameters of the mobile inspection system, operational capabilities of the mobile inspection system, operational constraints of the mobile inspection system, an availability of the inspection system, or a combination thereof. The manufacturing system state information includes, for the mobile robot, robot data that includes identification information of the mobile robot, physical parameters of the mobile robot, operational capabilities of the mobile robot, operational constraints of the mobile robot, an availability of the mobile robot, or a combination thereof.

In some forms, for each manufacturing system of the set of one or more manufacturing systems, a set of manufacturing process steps is defined based on a time in which a respective manufacturing system is available, where the time in which the respective manufacturing system is available is based on the manufacturing system state information.

In some forms, the method further includes, for each manufacturing system of the set of one or more manufacturing systems, broadcasting the set of manufacturing process steps to the respective manufacturing system.

In some forms, the method further includes, broadcasting a command to the set of one or more manufacturing systems to have the set of one or more manufacturing systems autonomously travel to the defined location.

In some forms, the method further includes remotely controlling an operation of the set of one or more manufacturing systems to autonomously travel to the defined location based on infrastructure sensor obtained from one or more infrastructure sensors.

The present disclosure also provides a method that includes defining a manufacturing transformation for a mobile workpiece based on mobile workpiece state information of the mobile workpiece, where the manufacturing transformation is an automated operation to be performed on the mobile workpiece. The method includes selecting a set of one or more manufacturing systems from among the one or more manufacturing systems for the mobile workpiece based on the manufacturing transformation and manufacturing system state information associated with the one or more manufacturing systems, where the manufacturing system state information provides data related to at least one of availability, capability, and constraints of the of the one or more manufacturing systems, and where the one or more manufacturing systems include a mobile machine, a mobile inspection system, a mobile robot, or a combination thereof. The method includes defining manufacturing process steps of the manufacturing transformation based on the set of one or more manufacturing systems. The method includes defining at least one of a time and a location for performing the manufacturing process steps on the mobile workpiece.

In some forms, the mobile workpiece state information includes a part type, quality data associated with mobile workpiece, inspection data associated with the mobile workpiece, or a combination thereof.

In some forms, the manufacturing system state information includes, for the mobile machine, machine data that includes identification information of the mobile machine, physical parameters of the mobile machine, operational capabilities of the mobile machine, operational constraints of the mobile machine, an availability of the mobile machine, or a combination thereof. The manufacturing system state information includes, for the mobile inspection system, inspection system data that includes identification information of the mobile inspection system, physical parameters of the mobile inspection system, operational capabilities of the mobile inspection system, operational constraints of the mobile inspection system, an availability of the inspection system, or a combination thereof. The manufacturing system state information includes, for the mobile robot, robot data that includes identification information of the mobile robot, physical parameters of the mobile robot, operational capabilities of the mobile robot, operational constraints of the mobile robot, an availability of the mobile robot, or a combination thereof.

In some forms, for each manufacturing system of the set of one or more manufacturing systems, a set of manufacturing process steps is defined based on the time in which a respective manufacturing system is available, where the time in which the respective manufacturing system is available is based on the manufacturing system state information.

In some forms, the method further includes, for each manufacturing system of the set of one or more manufacturing systems, broadcasting the set of manufacturing process steps to the respective manufacturing system.

In some forms, the method further includes, broadcasting a command to the set of one or more manufacturing systems to have the set of one or more manufacturing systems autonomously travel to the defined location.

In some forms, the method further includes remotely controlling an operation of the set of one or more manufacturing systems to autonomously travel to the defined location based on infrastructure sensor obtained from one or more infrastructure sensors.

The present disclosure also provides a system that includes a processor and a nontransitory computer-readable medium including instructions that are executable by the processor. The instructions include defining a manufacturing transformation for a mobile workpiece based on mobile workpiece state information of the mobile workpiece, where the manufacturing transformation is an automated operation to be performed on the mobile workpiece. The instructions include selecting a set of one or more manufacturing systems from among the one or more manufacturing systems for the mobile workpiece based on the manufacturing transformation and manufacturing system state information associated with the one or more manufacturing systems, where the manufacturing system state information provides data related to at least one of availability, capability, and constraints of the of the one or more manufacturing systems. The instructions include defining manufacturing process steps of the manufacturing transformation based on the set of one or more manufacturing systems. The instructions include defining a location for performing the manufacturing process steps on the mobile workpiece.

In some forms, the mobile workpiece state information includes a part type, quality data associated with mobile workpiece, inspection data associated with the mobile workpiece, or a combination thereof.

In some forms, the one or more manufacturing system include a mobile machine, a mobile inspection system, a mobile robot, or a combination thereof.

In some forms, the manufacturing system state information includes, for the mobile machine, machine data that includes identification information of the mobile machine, physical parameters of the mobile machine, operational capabilities of the mobile machine, operational constraints of the mobile machine, an availability of the mobile machine, or a combination thereof. The manufacturing system state information includes, for the mobile inspection system, inspection system data that includes identification information of the mobile inspection system, physical parameters of the mobile inspection system, operational capabilities of the mobile inspection system, operational constraints of the mobile inspection system, an availability of the inspection system, or a combination thereof. The manufacturing system state information includes, for the mobile robot, robot data that includes identification information of the mobile robot, physical parameters of the mobile robot, operational capabilities of the mobile robot, operational constraints of the mobile robot, an availability of the mobile robot, or a combination thereof.

Further areas of applicability will become apparent from the description provided herein. It should be understood that the description and specific examples are intended for purposes of illustration only and are not intended to limit the scope of the present disclosure.

DRAWINGS

Figure 2:
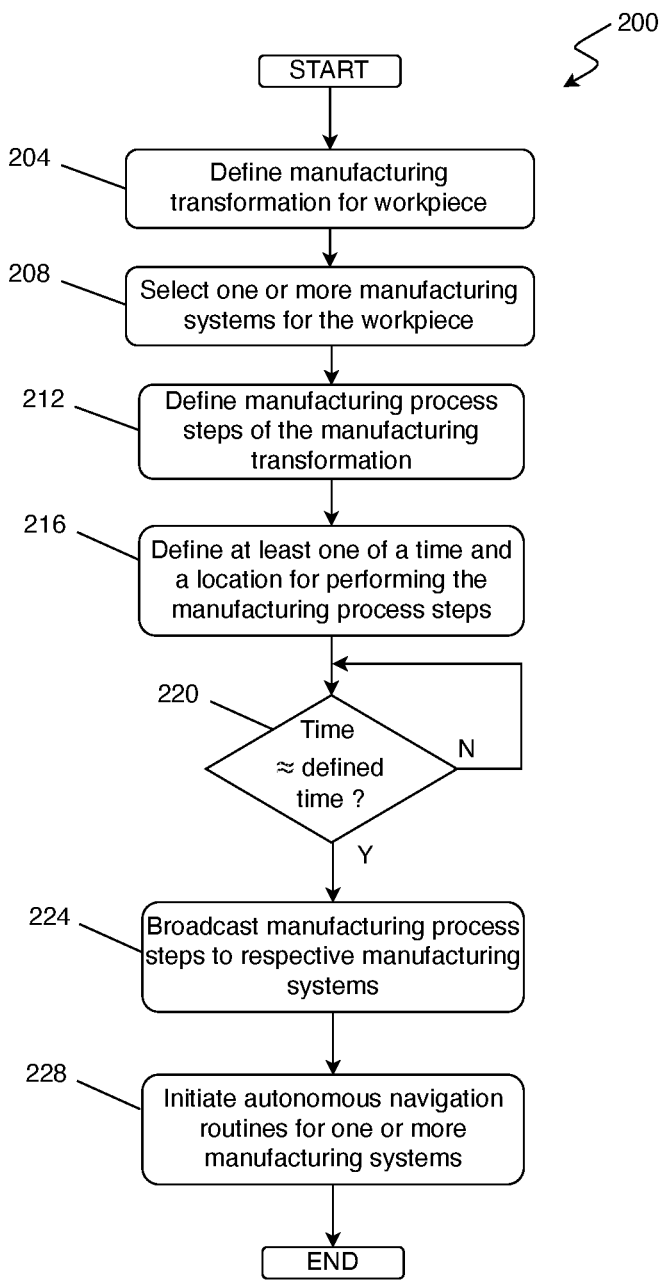

In order that the disclosure may be well understood, there will now be described various forms thereof, given by way of example, reference being made to the accompanying drawings, in which:

FIG. 1 is a block diagram of a manufacturing environment in accordance with the teachings of the present disclosure; and FIG. 2 illustrates an example control routine in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a dynamic manufacturing control system that defines an automated operation to be performed on a mobile workpiece based on state information of the mobile workpiece, selects one or more manufacturing systems for the mobile workpiece based on the manufacturing transformation and manufacturing system state information associated with the one or more manufacturing systems, and defines manufacturing process steps, a location for performing the manufacturing process steps, and/or a time for performing the manufacturing process steps. As such, the dynamic manufacturing control system provides for a manufacturing process that is dynamic and adaptable to design variations and/or quality issues associated with a component on the mobile workpiece.

Referring to FIG. 1, a manufacturing environment 10 for manufacturing a workpiece 20 (e.g., a vehicle part) is provided. The manufacturing environment 10 generally includes fixtures 30, machines 40, inspection systems 50, robots 60, one or more infrastructure sensors 70, a static manufacturing control system 80, and a dynamic manufacturing control system 90. In the following, the machines 40, the inspection systems 50, and/or the robots 60 may generally be referred to as "manufacturing systems."

While the static manufacturing control system 80 and the dynamic manufacturing control system 90 are illustrated as being located with other components of the manufacturing environment 10, it should be understood that the dynamic manufacturing control system 90 and/or the static manufacturing control system 80 may be positioned remotely from the other components of the manufacturing environment 10 in other forms. In one form, components of the manufacturing environment 10 are communicably coupled using any suitable wireless communication protocol (e.g., a Bluetooth®-type protocol, a cellular protocol, a wireless fidelity-type (WiFi-type) protocol, a near-field communication (NFC) protocol, an ultra-wideband (UWB) protocol, among others).

In one form, the fixtures 30 are partially or fully-autonomous and are configured to autonomously move to various locations within the environment 10, as instructed by the dynamic manufacturing control system 90. To autonomously move itself, the fixtures 30 include a control system 32 to control various movement systems of the fixture 30 (e.g., propulsion systems, steering systems, and/or brake systems) based on one or more navigation sensors 34 (e.g., a global navigation satellite system (GNSS) sensor, an imaging sensor, a local position sensor, among others) and the one or more infrastructure sensors 70. To perform the functionality described herein, the control system 32 may include one or more processor circuits that are configured to execute machine-readable instructions stored in one or more nontransitory computer-readable mediums, such as a random-access memory (RAM) circuit and/or read-only memory (ROM) circuit. The control system 32 may also include other components for performing the operations described herein such as, but not limited to, movement drivers and systems, transceivers, routers, and/or input/output interface hardware.

In one form, the fixtures 30 are configured to support and secure the workpiece 20 thereto, and accordingly, may include a fastening mechanism 36 that secures the workpiece 20 to the fixture 30. The fastening mechanism 36 includes, but is not limited to, a magnetic fastening assembly configured to secure the workpiece 20 onto the fixture 30 using a magnetic force, a vacuum fastening assembly configured to secure the workpiece 20 onto the fixture 30 using a vacuum force, an adhesive fastening assembly configured to secure the workpiece 20 onto the fixture 30 using an adhesive force, or a combination thereof.

In one form, the control system 32 of the fixtures 30 includes a workpiece state module 38 configured to broadcast workpiece state information to the static manufacturing control system 80 and/or the dynamic manufacturing control system 90. As an example, when the workpiece 20 is subjected to static manufacturing process steps, the workpiece state module 38 broadcasts the workpiece state information to the static manufacturing control system 80. As used herein, "static manufacturing process steps" refer to manufacturing processes in which the workpiece 20 is subjected to a manufacturing transformation using one or more manufacturing systems that are fixed. As used herein, "manufacturing transformation" refers to an automated operation to be performed by the respective manufacturing system on the workpiece 20.

As another example, when the fixture 30 is subjected to dynamic manufacturing process steps, the workpiece state module 38 broadcasts the workpiece state information to the dynamic manufacturing control system 90. As used herein, "dynamic manufacturing process steps" refer to manufacturing processes in which the workpiece 20 of the fixture 30 is subjected to a manufacturing transformation using one or more manufacturing systems that are mobile/moveable.

In one form, and as described below in further detail, while the workpiece 20 of the fixture 30 is subjected to the static manufacturing process steps, the static manufacturing control system 80 monitors the fixture 30 and/or the workpiece 20 and determines whether the workpiece 20 should be subjected to dynamic manufacturing process steps instead of the static manufacturing process steps. In another form, when at least one of the dynamic manufacturing control system 90 and the static manufacturing control system 80 determine the workpiece 20 of the fixture 30 is to be subjected to the dynamic manufacturing process steps, the dynamic manufacturing control system 90 defines a manufacturing transformation based on the workpiece state information, as described below in further detail.

In one form, the workpiece state information includes identification information of the fixture 30, information associated with the workpiece 20 provided thereon, a manufacturing transformation information associated with the fixture 30, an availability of the fixture 30, constraints associated with the fixture 30, or a combination thereof. In one form, the identification information of the fixture 30 may include information indicating an identification number of the fixture 30 or identifying indicia associated with the fixture 30 (e.g., an RFID tag, a barcode, among others), dimensions of the fixture 30, and/or location data of the fixture 30 as indicated by the navigation sensors 34. In one form, the information associated with the workpiece 20 may include information identifying the type of the workpiece 20 and/or identifying indicia associated with the workpiece 20.

In one form, the manufacturing transformation information associated with the fixture 30 indicates various manufacturing transformations that can be performed on the workpiece 20 thereon. As an example, the manufacturing transformation information may indicate that at least one of the machines 40, the inspection systems 50, and the robots 60 can heat the workpiece 20 provided on the fixture 30, load the workpiece 20 onto the fixture 30, check the temperature of the workpiece 20 provided on the fixture 30, remove material from the workpiece 20, join the workpiece 20 with another material (e.g., welding), among others. In one form, the availability of the fixture 30 indicates whether the fixture 30 is available for performing the manufacturing transformation.

In one form, the constraints associated with the fixture 30 include any information that inhibit the mobility of the fixture 30, such as the physical parameters of the fixture 30 (e.g., information indicating which directions and how quickly the fixture 30 can move) and/or priority information of the fixture 30 (e.g., whether the fixture 30 has a movement priority over another fixture 30, machine 40, inspection system 50, and/or robot 60 navigating in a surrounding area). Additional examples of the constraints associated with the fixture 30 include a structural health of the fixture 30 and/or dependency information of the fixture 30 (e.g., the fixture 30 moves in conjunction with another fixture 30, machine 40, inspection system 50, and/or robot 60).

In one form, one or more of the machines 40 are partially or fully-autonomous and are configured to autonomously move to various locations of the environment 10, as instructed by the dynamic manufacturing control system 90. To autonomously move itself, the machines 40 include a control system 42 to control various movement systems of the machine 40 (e.g., propulsion systems, steering systems, and/or brake systems) based on one or more navigation sensors 44 (e.g., a GNSS sensor, an imaging sensor, a local position sensor, among others) and the one or more infrastructure sensors 70. To perform the functionality described herein, the control system 42 may include one or more processor circuits that are configured to execute machine-readable instructions stored in one or more nontransitory computer-readable mediums, such as a RAM circuit and/or ROM circuit. The control system 42 may also include other components for performing the operations described herein such as, but not limited to, movement drivers and systems, transceivers, routers, and/or input/output interface hardware. In another form, one or more of the machines 40 are fixed within the manufacturing environment 10.

In one form, the machines 40 are configured to perform a manufacturing transformation (i.e., an automated operation on the fixture 30). As an example, the machines 40 may include one or more machining apparatuses 46 for heating the workpiece 20 provided on the fixture 30, removing material from the workpiece 20, joining the workpiece 20 with another material, among others. In one form, a first set of machines 40 may perform the manufacturing transformation in accordance with dynamic manufacturing process steps (i.e., the first set of machines 40 is mobile), and a second set of machines 40 may perform the manufacturing transformation in accordance with static manufacturing process steps (i.e., the second set of machines 40 is fixed).

In one form, the control system 42 of the machines 40 includes a machine state module 48 configured to broadcast machine state information to the dynamic manufacturing control system 90. The machine state information includes identification information of the machine 40, a capability associated with the machine 40, an availability of the machine 40, constraints associated with the machine 40, or a combination thereof. As described below in further detail, the dynamic manufacturing control system 90 is configured to match one of the machines 40 with the selected fixture 30 based on the machine state information.

In one form, the identification information of the machine 40 may include information indicating an identification number of the machine 40 or identifying indicia associated with the machine 40 (e.g., an RFID tag, a barcode, among others), dimensions of the machine 40, and/or location data of the machine 40 as indicated by the one or more navigation sensors 44. In one form, the capability information indicates what type of automated operation can be performed by the machine 40 on the workpiece 20 of the fixture 30. In one form, the availability of the machine 40 indicates whether the machine 40 is available for performing the manufacturing transformation.

In one form, the constraints associated with the machine 40 include any information that inhibit the mobility of the machine 40. As an example, the constraints associated with the machine 40 may include the physical parameters of the machine 40 (e.g., information indicating which directions and how quickly the machine 40 can move) and/or priority information of the machine 40 (e.g., whether the machine 40 has a movement priority over another fixture 30, machine 40, inspection system 50, and/or robot 60 navigating in a surrounding area). As another example, the constraints associated with the machine 40 may include a structural health of the machine 40 and/or dependency information of the machine 40 (e.g., the machine 40 moves in conjunction with another fixture 30, machine 40, inspection system 50, and/or robot 60).

In one form, one or more of the inspection systems 50 are partially or fully-autonomous and are configured to autonomously move to various locations of the environment 10, as instructed by the dynamic manufacturing control system 90. To autonomously move itself, the inspection systems 50 include a control system 52 to control various movement systems of the inspection system 50 (e.g., propulsion systems, steering systems, and/or brake systems) based on one or more navigation sensors 54 (e.g., a GNSS sensor, an imaging sensor, a local position sensor, among others) and the one or more infrastructure sensors 70. To perform the functionality described herein, the control system 52 may include one or more processor circuits that are configured to execute machine-readable instructions stored in one or more nontransitory computer-readable mediums, such as a RAM circuit and/or ROM circuit. The control system 52 may also include other components for performing the operations described herein such as, but not limited to, movement drivers and systems, transceivers, routers, and/or input/output interface hardware. In another form, one or more of the inspection systems 50 are fixed within the manufacturing environment 10.

In one form, the inspection systems 50 are configured to inspect the workpiece 20. As an example, the inspection systems 50 may include one or more inspection apparatuses 56 for checking the temperature of the workpiece 20 provided on the fixture 30, evaluating the quality and/or defects of the workpiece 20, among others. In one form, a first set of inspection systems 50 may perform the manufacturing transformation in accordance with dynamic manufacturing process steps (i.e., the first set of inspection systems 50 is mobile), and a second set of inspection systems 50 may perform the manufacturing transformation in accordance with static manufacturing process steps (i.e., the second set of inspection systems 50 is fixed).

In one form, the control system 52 of the inspection systems 50 includes an inspection system state module 58 configured to broadcast inspection system state information to the dynamic manufacturing control system 90. The inspection system state information includes quality information associated with the workpiece 20, identification information of the inspection systems 50, a capability associated with the inspection systems 50, an availability of the inspection system 50, constraints associated with the inspection systems 50, or a combination thereof. As described below in further detail, the dynamic manufacturing control system 90 is configured to match one of the inspection systems 50 with the selected fixture 30 based on the inspection system state information.

In one form, the quality information associated with the workpiece 20 indicates whether the workpiece satisfies a predetermined quality condition (e.g., the quality information indicates whether the workpiece 20 has a defect). In one form, the identification information of the inspection system 50 may include information indicating an identification number of the inspection system 50 or identifying indicia associated with the inspection system 50 (e.g., an RFID tag, a barcode, among others), dimensions of the inspection system 50, and/or location data of the inspection system 50 as indicated by the one or more navigation sensors 54. In one form, the capability information indicates what type of automated operation can be performed by the inspection system 50 on the fixture 30. In one form, the availability of the inspection system 50 indicates whether the inspection system 50 is available for performing the manufacturing transformation.

In one form, the constraints associated with the inspection system 50 include any information that inhibit the mobility of the inspection system 50. As an example, constraints associated with the inspection system 50 may include the physical parameters of the inspection system 50 (e.g., information indicating which directions and how quickly the inspection system 50 can move) and/or priority information of the inspection system 50 (e.g., whether the inspection system 50 has a movement priority over another fixture 30, machine 40, inspection system 50, and/or robot 60 navigating in a surrounding area). As another example, the constraints associated with the inspection system 50 a structural health of the inspection system 50 and/or dependency information of the inspection system 50 (e.g., the inspection system 50 moves in conjunction with another fixture 30, machine 40, inspection system 50, and/or robot 60).

In one form, one or more of the robots 60 are mobile robots that are partially or fully-autonomous and are configured to autonomously move to various locations of the manufacturing environment 10, as instructed by the dynamic manufacturing control system 90. To autonomously move itself, the robots 60 each include a control system 62 to control various movement systems of the robot 60 (e.g., propulsion systems, steering systems, and/or brake systems) via actuators 64 and based on one or more navigation sensors 66 (e.g., a GNSS sensor, an imaging sensor, a local position sensor, among others) and the one or more infrastructure sensors 70. Furthermore, the control systems 62 are configured to operate the actuators 64 to control the motion of one or more robotic links (e.g., robotic arms) attached thereto and thereby perform one or more automated operations defined in a robot task database (e.g., performing a manufacturing operation on the vehicle component). In another form, one or more of the robots 60 are fixed within the manufacturing environment 10.

While the manufacturing environment 10 shown in FIG. 1 illustrates robots 60, it should be understood that the manufacturing environment 10 can include various other unmanned vehicles in addition to or in place of the robots 60 in other forms. As an example, the manufacturing environment 10 can include drones that are similarly configured as the robots 60 (e.g., the drones include a movement system to control autonomous movement throughout the manufacturing environment 10 and perform the transfer operations described herein). Furthermore, it should be understood that the manufacturing environment 10 can include various human operators in addition to the robots 60 in other forms.

In one form, robots 60 are configured to perform a manufacturing transformation (i.e., an automated operation on the fixture 30). As an example, the robots 60 may include one or more systems for loading the workpiece 20 onto the fixture 30, joining the workpiece 20 with another material, assisting or cooperating with the machines 40 to perform a respective manufacturing transformation, among others. In one form, a first set of robots 60 may perform the manufacturing transformation in accordance with dynamic manufacturing process steps (i.e., the first set of robots 60 is mobile), and a second set of robots 60 may perform the manufacturing transformation in accordance with static manufacturing process steps (i.e., the second set of robots 60 is fixed).

In one form, the control system 62 of the robots 60 includes a robot state module 68 configured to broadcast robot state information to the dynamic manufacturing control system 90. The robot state information includes identification information of the robots 60, an availability of the robot 60, a capability associated with the robots 60, constraints associated with the robots 60, or a combination thereof. As described below in further detail, the dynamic manufacturing control system 90 is configured to match one of the robots 60 with the selected fixture 30 based on the robot state information.

In one form, the identification information of the robot 60 may include information indicating an identification number of the robot 60 or identifying indicia associated with the robot 60 (e.g., an RFID tag, a barcode, among others), dimensions of the robot 60, and/or location data of the robot 60 as indicated by the one or more navigation sensors 66. In one form, the capability information indicates what type of automated operation can be performed by the robot 60 on the fixture 30 and whether the robot 60 cooperates with other manufacturing systems to carry out the manufacturing transformation. In one form, the availability of the robot 60 indicates whether the robot 60 is available for performing the manufacturing transformation.

In one form, the constraints associated with the robot 60 include any information that inhibit the mobility of the robot 60. Example constraints associated with the robot 60 include the physical parameters of the robot 60 (e.g., information indicating which directions and how quickly the robot 60 can move) and/or priority information of the robot 60 (e.g., whether the robot 60 has a movement priority over another fixture 30, machine 40, inspection system 50, and/or robot 60 navigating in a surrounding area). Additional constraints associated with the robot 60 may include a structural health of the robot 60 and/or dependency information of the robot 60 (e.g., the robot 60 moves in conjunction with another fixture 30, machine 40, inspection system 50, and/or robot 60).

In one form, the infrastructure sensors 70 are imaging sensors that obtain imaging data of the manufacturing environment 10 and provide said imaging data to the fixtures 30, the machines 40, the inspection systems 50, and the robots 60 for autonomous control, as described above. The infrastructure sensors 70 may include a two-dimensional camera, a three-dimensional camera, an infrared sensor, a radar scanner, a laser scanner, a LIDAR sensor, an ultrasonic sensor, among others. In one form, the infrastructure sensors 70 are provided on an infrastructure element within the manufacturing environment 10, such as, but not limited to, a tower, a light pole, a building, a sign, drones, robots, among other fixed and/or moveable elements of the manufacturing environment 10. As described below in further detail, the dynamic manufacturing control system 90 autonomously controls the movement of the fixture 30, the machine 40, the inspection system 50, and/or the robot 60 such that the dynamic manufacturing process steps can be carried out at a defined location.

In the following, the machine state information, the inspection system state information, and the robot state information from respective machines 40, inspection systems 50, and robots 60 are collectively referred to as "manufacturing system state information."

In one form, the static manufacturing control system 80 includes a static state module 82 and a notification module 84. It should be readily understood that any one of the components of the static manufacturing control system 80 can be provided at the same location or distributed at different locations and communicably coupled accordingly. To perform the functionality as described herein, the static manufacturing control system 80 includes one or more processor circuits that are configured to execute machine-readable instructions stored in one or more nontransitory computer-readable mediums, such as a RAM circuit and/or ROM circuit. It should be readily understood that the static manufacturing control system 80 may include other components for performing the operations described herein such as, but not limited to, communication transceivers, routers, input/output communication interfaces, databases, among others.

In one form, the static state module 82 is configured to obtain workpiece state information from the fixtures 30 having a workpiece 20 that is subjected to static manufacturing process steps. Furthermore, the static state module 82 is configured to obtain manufacturing system state information from respective machines 40, inspection systems 50, and robots 60 (i.e., manufacturing systems) that are performing the manufacturing transformation in accordance with the static manufacturing process steps.

In one form, the notification module 84 is configured to broadcast a notification to the dynamic manufacturing control system 90 in response to the workpiece state information and/or manufacturing system state information from the respective manufacturing systems indicating that the workpiece 20 is to be subjected to the dynamic manufacturing process steps. As an example, the notification module 84 broadcasts a notification to the dynamic manufacturing control system 90 in response to the inspection state information indicating the workpiece 20 does not satisfy a predetermined quality condition. As another example, the notification module 84 broadcasts a notification to the dynamic manufacturing control system 90 in response to the workpiece state information indicating that the workpiece 20 includes a design variant that makes it unsuitable for the static manufacturing process steps.

In one form, the dynamic manufacturing control system 90 includes a manufacturing transformation module 92, a matching module 94, a process step module 96, a location module 98, and an autonomous control module 99. It should be readily understood that any one of the components of the dynamic manufacturing control system 90 can be provided at the same location or distributed at different locations and communicably coupled accordingly. To perform the functionality as described herein, the dynamic manufacturing control system 90 includes one or more processor circuits that are configured to execute machine-readable instructions stored in one or more nontransitory computer-readable mediums, such as a RAM circuit and/or ROM circuit. It should be readily understood that the dynamic manufacturing control system 90 may include other components for performing the operations described herein such as, but not limited to, communication transceivers, routers, input/output communication interfaces, databases, among others.

In one form, the manufacturing transformation module 92 is configured to define a manufacturing transformation for a workpiece 20 based on the workpiece state information. As a specific example, the manufacturing transformation module 92 may define the manufacturing transformation as heating the workpiece 20 based on the workpiece state information indicating that the RFID tag of the fixture 30 identifies it as one that is capable of being subjected to dynamic manufacturing process steps, the type of workpiece 20 is capable of being subjected to dynamic manufacturing process steps, a heating operation can be carried out on the fixture 30 and the workpiece 20, and the fixture 30 is currently available for performing the heating process.

In another form, the manufacturing transformation module 92 is configured to define a manufacturing transformation for a workpiece 20 in response to the inspection system 50 inspecting the workpiece 20 in accordance with the static manufacturing process steps indicating that the dynamic manufacturing process steps are needed for the workpiece 20. As an example, the manufacturing transformation module 92 may define the manufacturing transformation as repeating a welding process if the inspection system 50 determines that dynamic manufacturing process steps are needed based on a weld quality of the workpiece 20 not satisfying a predetermined quality condition.

In one form, the matching module 94 is configured to match the workpiece 20 and/or the fixture 30 with a machine 40 that is mobile, an inspection system 50 that is mobile, and/or a robot 60 that is mobile based on the manufacturing transformation and the manufacturing system state information (i.e., the machine state information, the inspection system state information, and/or the robot state information of the robots 60). As a specific example, in response to a determination that the manufacturing transformation is provided as heating the workpiece 20, the matching module 94 selects, based on the machine state information, a mobile machine 40 configured to carry out a heating operation. Furthermore, the matching module 94 selects, based on the inspection system state information, a mobile inspection system 50 configured to determine a temperature of the workpiece 20. Still further, the matching module 94 selects, based on the robot state information, a mobile robot 60 configured to lift and position the rotate the mobile machine 40 such that it can effectively perform the heating operation.

In one form, the process step module 96 defines dynamic manufacturing process steps for each of the identified machine 40, identified inspection system 50, and/or identified robot 60. In one form, the dynamic manufacturing process steps for each identified manufacturing system is based on the availability of the for each identified manufacturing system. As a specific example, in response to the selection of the machine 40, the inspection system 50, and the robot 60 by the matching module 94, the process step module 96 generates instructions for the robot 60 to lift and position the machine 40 as soon as the machine 40 is available. Furthermore, the process step module 96 generates instructions for the machine 40 to raise its temperature to a predefined value and for the inspection system 50 to measure the temperature of the machine 40 once the robot 60 has lifted and positioned the machine 40. Still further, the process step module 96 generates instructions for the machine 40 to contact (i.e., touch) the workpiece once the inspection system 50 indicates the temperature of the machine 40 is equal to the predefined value or when a predefined period of time has elapsed. Additionally, the process step module 96 generates instructions for the inspection system 50 to measure the temperature of the workpiece 20 and the machine 40 to stop contacting the workpiece 20 once the temperature of the workpiece 20 is equal to a predefined value. It should be understood that various other dynamic manufacturing process steps may be defined by the process step module 96 and is not limited to the example described herein.

In one form, the location module 98 defines a location for performing the dynamic manufacturing process steps defined by the process step module 96. As an example, the location module 98 obtains the sensor data from the infrastructure sensors 70 and the navigation sensors 34, 44, 54, 66 to identify available locations within the manufacturing environment 10. Further, the location module 98 determines an operational area to perform the dynamic manufacturing process steps defined by process step module 96. In some forms, the operational areas are stored in a database and uniquely correspond to each of the respective dynamic manufacturing process steps. As such, the location module 98 may define the location based on the available locations and the operational area.

In one form, the autonomous control module 99 instructs each of the identified manufacturing systems to autonomously travel to the defined location. As an example, the autonomous control module 99 instructs the identified machine 40, the identified inspection system 50, and the identified robot 60 by transmitting a path to the respective control systems 42, 52, 62, which utilize the path to autonomously travel to the defined location. As another example, the autonomous control module 99 remotely and autonomously controls the identified machine 40, the identified inspection system 50, and the identified robot 60 as it travels to the defined location.

With reference to FIG. 2, an example routine 200 for generating the dynamic manufacturing process steps is shown and executed by the dynamic manufacturing control system 90. At 204, the dynamic manufacturing control system 90 defines a manufacturing transformation for the workpiece 20. At 208, the dynamic manufacturing control system 90 selects one or more manufacturing systems (e.g., one of the machines 40, one of the inspection systems 50, and/or one of the robots 60) for the workpiece 20 based on the manufacturing transformation and the manufacturing system state information associated with the one or more manufacturing systems. At 212, the dynamic manufacturing control system 90 defines the manufacturing process steps of the manufacturing transformation based on a time in which a respective manufacturing system is available. In some forms, the time in which the respective manufacturing system is available is based on the manufacturing system state information of the respective manufacturing system. At 216, the dynamic manufacturing control system 90 defines at least one of a time and a location for performing the manufacturing process steps.

At 220, the dynamic manufacturing control system 90 determines whether the current time is approximately equal (or equal) to the defined time. When the current time is approximately equal (or equal) to the defined time, the dynamic manufacturing control system 90 broadcast the manufacturing process steps to the respective manufacturing systems at 224. Otherwise, the routine 200 remains at 220, where the dynamic manufacturing control system 90 waits for the current time to be approximately equal (or equal) to the defined time. At 228, the dynamic manufacturing control systems 90 and/or the respective manufacturing systems initiate respective autonomous navigation routines and proceed to the defined location. The routine 200 then ends.

It should be understood that routine 200 is merely an example routine and other routines may be performed in other forms.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:

defining a manufacturing transformation for a workpiece based on workpiece state information of the workpiece, wherein the manufacturing transformation is an automated operation to be performed on the workpiece, and wherein the workpiece is disposed on a moveable fixture;

selecting a set of one or more manufacturing systems from among the one or more manufacturing systems for the workpiece based on the manufacturing transformation and manufacturing system state information associated with the one or more manufacturing systems, wherein the manufacturing system state information provides data related to at least one of availability, capability, and constraints of the of the one or more manufacturing systems;

defining manufacturing process steps of the manufacturing transformation based on the set of one or more manufacturing systems;

defining a location for performing the manufacturing process steps on the workpiece based on sensor data obtained from one or more operational areas associated with the manufacturing process steps; and broadcasting a command to the set of one or more manufacturing systems and the moveable fixture to autonomously travel to the location.

2. The method of claim 1, wherein the workpiece state information includes a part type, quality data associated with the workpiece, inspection data associated with the workpiece, or a combination thereof.

3. The method of claim 1, wherein the one or more manufacturing system include a mobile machine, a mobile inspection system, a mobile robot, or a combination thereof.

4. The method of claim 3, wherein the manufacturing system state information includes:
for the mobile machine, machine data that includes identification information of the mobile machine, physical parameters of the mobile machine, operational capabilities of the mobile machine, operational constraints of the mobile machine, an availability of the mobile machine, or a combination thereof;
for the mobile inspection system, inspection system data that includes identification information of the mobile inspection system, physical parameters of the mobile inspection system, operational capabilities of the mobile inspection system, operational constraints of the mobile inspection system, an availability of the inspection system, or a combination thereof; and
for the mobile robot, robot data that includes identification information of the mobile robot, physical parameters of the mobile robot, operational capabilities of the mobile robot, operational constraints of the mobile robot, an availability of the mobile robot, or a combination thereof.

5. The method of claim 1, wherein for each manufacturing system of the set of one or more manufacturing systems, a set of manufacturing process steps is defined based on a time in which a respective manufacturing system is available, wherein the time in which the respective manufacturing system is available is based on the manufacturing system state information.

6. The method of claim 5 further comprising, for each manufacturing system of the set of one or more manufacturing systems, broadcasting the set of manufacturing process steps to the respective manufacturing system.

7. The method of claim 1 further comprising remotely controlling an operation of the set of one or more manufacturing systems to autonomously travel to the defined location based on infrastructure sensor obtained from one or more infrastructure sensors.

8. A method comprising:
defining a manufacturing transformation for a workpiece based on workpiece state information of the workpiece, wherein the manufacturing transformation is an automated operation to be performed on the workpiece;
selecting a set of one or more manufacturing systems from among the one or more manufacturing systems for the workpiece based on the manufacturing transformation and manufacturing system state information associated with the one or more manufacturing systems, wherein the manufacturing system state information provides data related to at least one of availability, capability, and constraints of the of the one or more manufacturing systems, and wherein the one or more manufacturing systems include a mobile machine, a mobile inspection system, a mobile robot, or a combination thereof;
defining manufacturing process steps of the manufacturing transformation based on the one or more manufacturing systems;
defining a time and a location for performing the manufacturing process steps on the workpiece based on sensor data obtained from one or more operational areas associated with the manufacturing process steps; and
broadcasting a command to the set of one or more manufacturing systems and the moveable fixture to autonomously travel to the location at the time.

9. The method of claim 8, wherein the workpiece state information includes a part type, quality data associated with the workpiece, inspection data associated with the workpiece, or a combination thereof.

10. The method of claim 8, wherein the manufacturing system state information includes machine data associated with the mobile machine, inspection system data associated with the mobile inspection system, and robot data associated with the mobile robot.

11. The method of claim 10, wherein the manufacturing system state information includes:
for the mobile machine, machine data that includes identification information of the mobile machine, physical parameters of the mobile machine, operational capabilities of the mobile machine, operational constraints of the mobile machine, an availability of the mobile machine, or a combination thereof;
for the mobile inspection system, inspection system data that includes identification information of the mobile inspection system, physical parameters of the mobile inspection system, operational capabilities of the mobile inspection system, operational constraints of the mobile inspection system, an availability of the inspection system, or a combination thereof; and
for the mobile robot, robot data that includes identification information of the mobile robot, physical parameters of the mobile robot, operational capabilities of the mobile robot, operational constraints of the mobile robot, an availability of the mobile robot, or a combination thereof.

12. The method of claim 8, wherein for each manufacturing system of the set of one or more manufacturing systems, a set of manufacturing process steps is defined based on the time in which a respective manufacturing system is available, wherein the time in which the respective manufacturing system is available is based on the manufacturing system state information.

13. The method of claim 12 further comprising, for each manufacturing system of the set of one or more manufacturing systems, broadcasting the set of manufacturing process steps to the respective manufacturing system.

14. The method of claim 8 further comprising remotely controlling an operation of the set of one or more manufacturing systems to autonomously travel to the defined location based on infrastructure sensor obtained from one or more infrastructure sensors.

15. A system comprising:
a processor; and
a nontransitory computer-readable medium including instructions that are executable by the processor, wherein the instructions include:
defining a manufacturing transformation for a workpiece based on workpiece state information of the workpiece, wherein the manufacturing transformation is an automated operation to be performed on the workpiece;
selecting a set of one or more manufacturing systems from among the one or more manufacturing systems for the workpiece based on the manufacturing transformation and manufacturing system state information associated with the one or more manufacturing systems, wherein the manufacturing system state information provides data related to at least one of availability, capability, and constraints of the of the one or more manufacturing systems;

defining manufacturing process steps of the manufacturing transformation based on the set of one or more manufacturing systems;

defining a location for performing the manufacturing process steps on the workpiece based on sensor data obtained from one or more operational areas associated with the manufacturing process steps; and broadcasting a command to the set of one or more manufacturing systems and the moveable fixture to autonomously travel to the location.

16. The system of claim 15, wherein the workpiece state information includes a part type, quality data associated with the workpiece, inspection data associated with the workpiece, or a combination thereof.

17. The system of claim 15, wherein the one or more manufacturing system include a mobile machine, a mobile inspection system, a mobile robot, or a combination thereof.

18. The system of claim 17, wherein the manufacturing system state information includes:

for the mobile machine, machine data that includes identification information of the mobile machine, physical parameters of the mobile machine, operational capabilities of the mobile machine, operational constraints of the mobile machine, an availability of the mobile machine, or a combination thereof;

for the mobile inspection system, inspection system data that includes identification information of the mobile inspection system, physical parameters of the mobile inspection system, operational capabilities of the mobile inspection system, operational constraints of the mobile inspection system, an availability of the inspection system, or a combination thereof; and for the mobile robot, robot data that includes identification information of the mobile robot, physical parameters of the mobile robot, operational capabilities of the mobile robot, operational constraints of the mobile robot, an availability of the mobile robot, or a combination thereof.

* * * * *